(Model.)
H. SATTLER.
WHEEL PLOW.
No. 285,766. Patented Sept. 25, 1883.
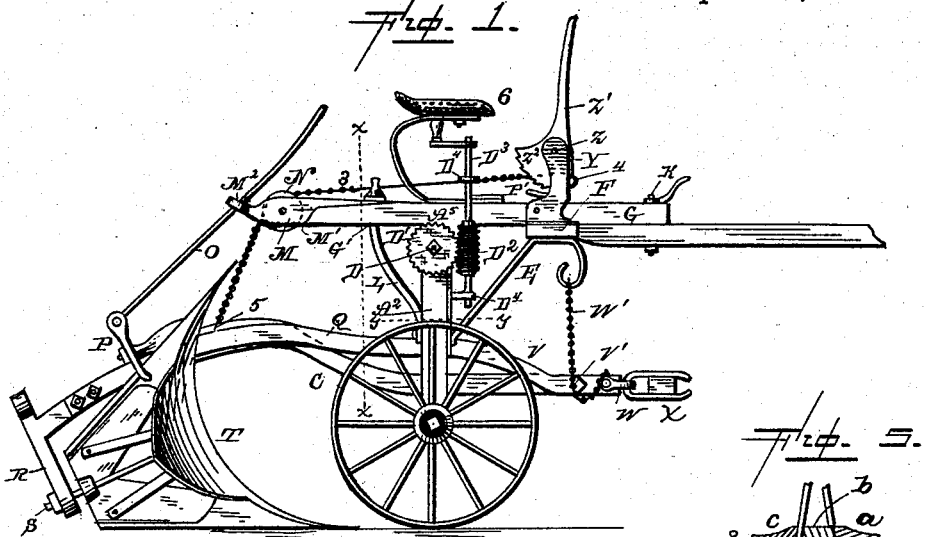
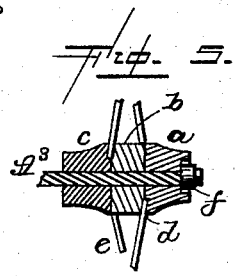
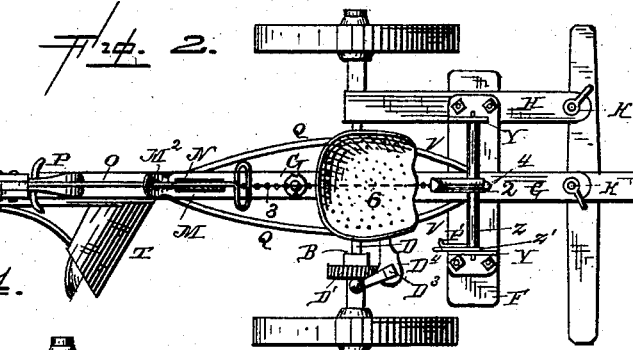
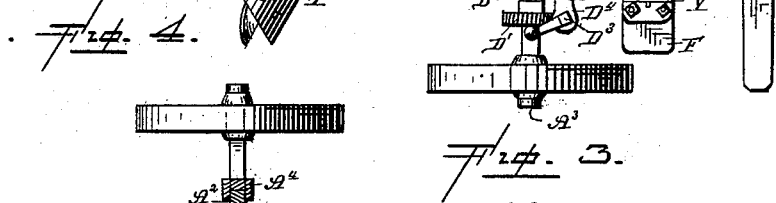
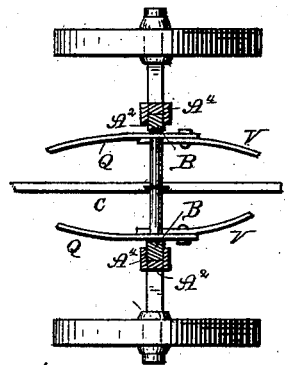
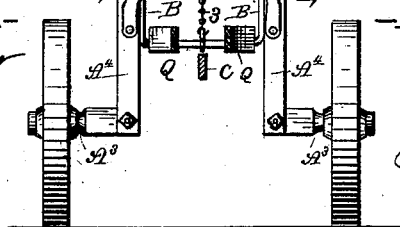
Witnesses:
Louis F. Gardner
J. W. Garner
Inventor:
H. Sattler
per
J. A. Lehmann,
Atty.
N. PETERS, Photo-Lithographer, Washington, D. C.

United States Patent Office.

HENRY SATTLER, OF ROCK HILL, MISSOURI.

WHEEL-PLOW.

SPECIFICATION forming part of Letters Patent No. 285,766, dated September 25, 1883.

Application filed May 28, 1883. (Model.)

*To all whom it may concern:*

Be it known that I, HENRY SATTLER, of Rock Hill, in the county of St. Louis and State of Missouri, have invented certain new and useful Improvements in Wheel-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in wheel-plows; and it consists in the combination and arrangement of devices, as will be more fully described hereinafter, whereby a plow is produced that is capable of suitable adjustments to enable it to be run into the ground at any desired angle, or to be raised entirely therefrom when in transportation, the plow being of the double variety, so as to enable it to be used as a right or left hand plow.

In the accompanying drawings, Figure 1 is a side elevation of my invention. Fig. 2 is a top plan view of the same. Fig. 3 is a rear elevation on the line $x\ x$ of Fig. 1. Fig. 4 is a horizontal section on the line $y\ y$ of Fig. 1. Fig. 5 is a detail section.

A represents the axle, which is bent in the form shown in Fig. 3, having the inverted-U-shaped portion A' and the vertical standards A'', from the lower ends of which project outwardly the spindles A''', upon which the wheels are secured in the usual manner.

Bolted to opposite sides of the standards A'' are the plates $A^4$, which project inwardly beyond the standards a suitable distance, so as to form slides in which the yoke B, that is secured to the plow-beam C, can reciprocate vertically, as shown.

D represents a shaft that is journaled to the other side of the axle, and is provided at one end with a spur-wheel, D', in which meshes a worm, D'', which forms part of the shaft D''', that is journaled in suitable brackets, $D^4$, secured to the standards A'' and to the axle, this shaft being provided with a crank at its upper end within easy reach of the driver. Secured to this shaft D, and wrapping around it, are the chains or cords B', which are connected to the yoke B. By means of this construction the plow-beam can be raised or lowered to any desired point, as will be readily understood.

Rigidly bolted to the front side of the standards A'' are the braces E, which are bent at an angle thereto, and extend forward and upward, and form a support for the foot-board F, which forms a portion of the frame, this foot-board F having bolted to it and to the axle A' at the point $A^5$, the horizontal draft-beam G, this draft-beam being secured on a line with the center of the frame. Secured to one of the outer ends of the foot-board and to the axle, by means of the bolts K, as shown at Figs. 1 and 2, is a similar but shorter draft-beam, H. Extending from the rear side of the standards A'', and being bolted thereto by the same bolts that secure the braces E, is an inverted-V-shaped brace, L, which extends backward, and is bolted to the beam G at the point G', as shown. The rear end of the beam G has secured to it a casting, M, which has an opening, M', made in it, in which opening is journaled a sheave, N, the rear of this casting being provided with an extension, in which is formed the opening $M^2$, through which the rod O passes, that is attached at its rear end to the drop-latch P, that is pivoted to the plow-beam at a suitable point.

Secured to the plow-beam, near the rear end thereof, are the braces Q, between which, at their rear ends, is secured a bracket, R, the lower portion of which is provided with an opening, through which the pivotal shaft S of the double plow T passes, this shaft being also pivoted in the lower end of the plow standard. The forward ends of these side braces are secured to the yoke B, and to the rear ends of the forward side braces, V, the front ends of which are bolted to the plow-beam at the point V', as shown.

The front end of the plow-beam is provided with a clevis, W, to which is secured the double-tree X, this double-tree having chains W', which connect it near its outer ends with hooks that form backward-pending extensions of the braces E. Secured to the upper side of the foot-board F, at one end thereof, and also on the draft-beam H, are the standards or brackets Y, one of which is provided with a gravity-pawl, P'. Journaled in the upper ends of these brackets is the shaft Z, to one end of which is secured the lever Z', the lower end of which has a segmental rack, Z'', with which the pawl P' engages at any desired point. Depending from the center of this shaft, and being also rigidly secured thereto, is the curved arm 2, around which passes the upper end of the elevating chain or rod 3, the upper end of which is secured in a finger, 4, this chain serving to connect the arm Z to the plow-beam at the point 5, passing over the shaft N on its way thereto. Situated at a suitable point upon the draft-beam G is the driver's seat 6.

By having the plow-beam pivoted in the yoke B, which yoke is allowed a vertical adjustment, and by having the rear end of the plow-beam connected through the chain to the rock-shaft Z, the angle at which the plow enters the ground can be determined to suit the nature of the work to be done, and by means of the elevating mechanism attached to the yoke, in connection with the mechanism for altering the angle of the plow, the plow can be raised entirely above the ground when in transportation, as will be readily understood.

The latch P secures the double plow when in position either as a right or a left hand plow.

In Fig. 5 I illustrate in section a detail of construction of a wheel that is adapted for use in this plow, the hub of which wheel consists of the three sections, $a\ b\ c$, which are provided with openings $d$, which register with each other, and in which openings are placed the inner ends of the spokes $e$, which spokes are clamped between them by means of the nut $f$, that screws upon the outer end of the spindle, and which also serves to keep the wheel in place upon the spindle.

A plow thus constructed will be found exceedingly serviceable, is simple, strong, and not liable to get out of order, and yet easily and cheaply manufactured.

Having thus described my invention, I claim—

The combination of the plow-beam C, provided with the side bars, Q V, the yoke B, and the grooved axle $A^4$, within which the yoke moves vertically, an elevating mechanism, and the chain 3, which is secured at its rear end to the beam which is pivoted between the braces, whereby the rear end of the beam can be raised and lowered, substantially as shown.

In testimony whereof I affix my signature in presence of two witnesses.

HENRY SATTLER.

Witnesses:
C. C. GARRETT,
D. C. TAYLOR.